United States Patent Office 3,415,227
Patented Dec. 10, 1968

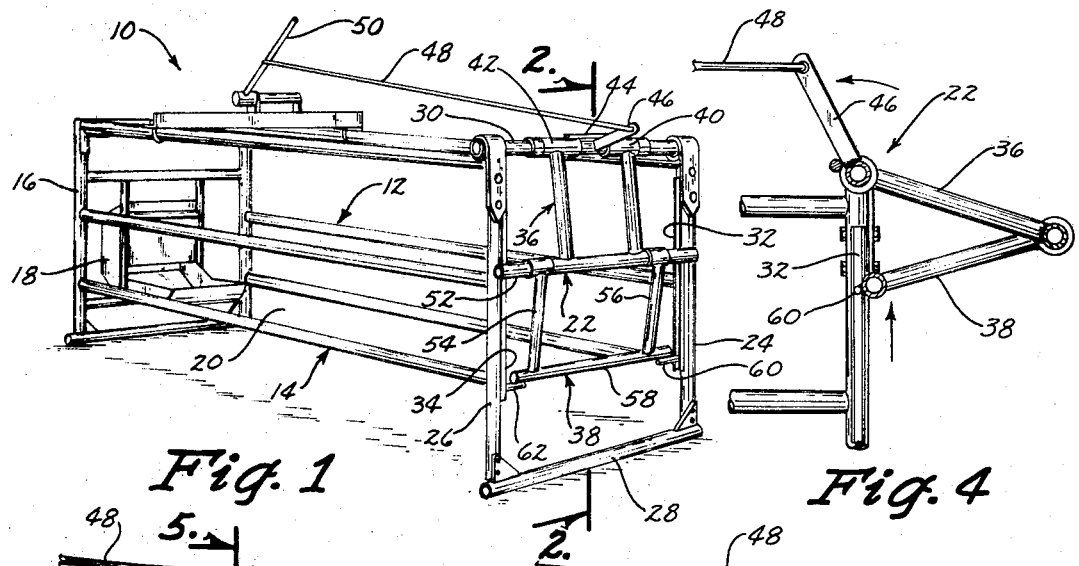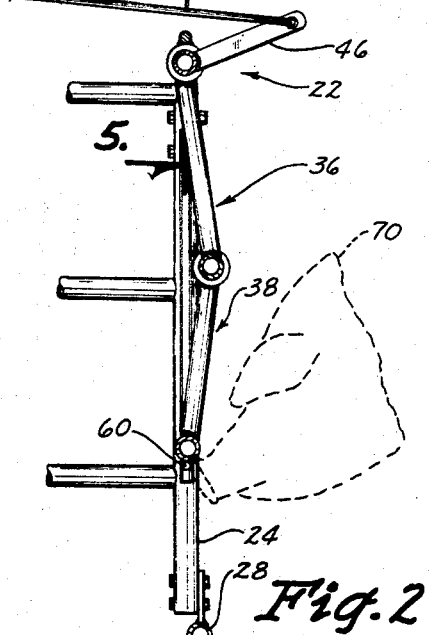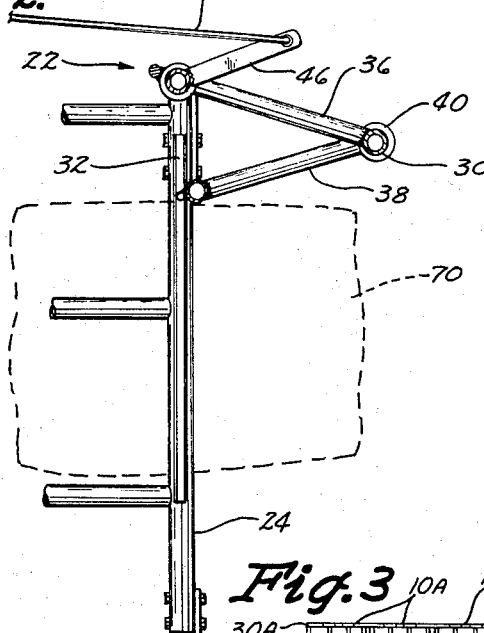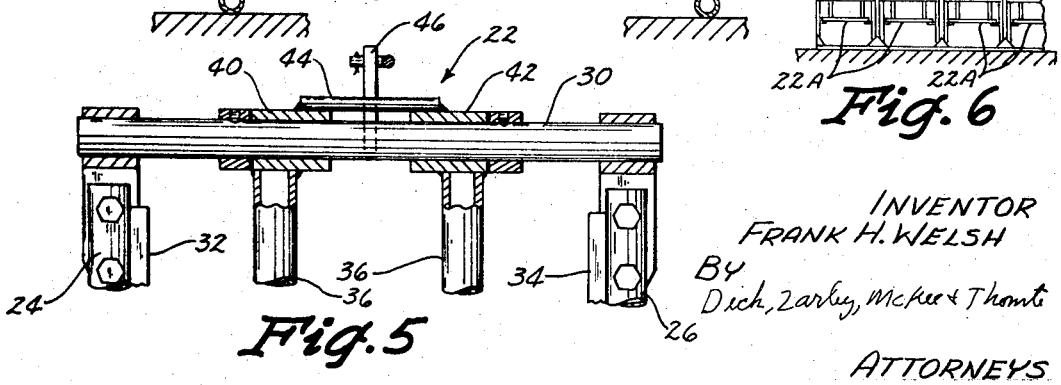

3,415,227
ANIMAL STALL AND GATE MEANS
Frank H. Welsh, Blairsburg, Iowa 50034
Filed Nov. 15, 1966, Ser. No. 594,524
6 Claims. (Cl. 119—27)

ABSTRACT OF THE DISCLOSURE

A device including an enclosure structure with a gate at one end opposite a feeding station wherein the gate includes a pair of pivotally interconnected vertically arranged sections that may be raised by a pig or the like. A shaft extends along the pivotal axis of the top gate section and includes an upstanding post connected to a manual control means. The post is adapted to engage a stop means on the gate section as the shaft is rotated for pivoting the top gate section upwardly and thereby raising the gate to an open position. The gate may be returned to a closed position by gravity. A series of animal feeder enclosure structures may be placed side by side and operated together in the opening and closing of the gate.

---

Farm animals and in particular swine have the habit of eating as much feed as they like as long as plenty is available. Under a free feeding system certain hogs will eat more than their share at the expense of other swine. This is particularly a problem with pregnant sows since it is necessary to control the feed intake of each animal. The same problem exists with gilts and breeding boars.

Thus, one of the principal objects of this invention is to provide an animal feeder which will limit the amount of feed made available to each animal.

A further related object of this invention is to provide an animal feeder having an access opening with a gate which may be readily opened and closed.

Yet another object of this invention is to provide an animal feeder having a gate in the access opening which is gravity operated to the closed position and may be opened by each individual animal.

A still further object of this invention is to provide a plurality of animal feeders each having their own gate across the access opening which may be individually opened by an animal and release means being provided for simultaneously opening all of the gates for releasing the animals.

A still further object of this invention is to provide an animal feeder having a gate unit which may be opened by the animals and closed by gravity and further includes a gate opening device for manually opening the gate for release of the animals, this device being capable of operating a series of gates on animal feeders in side by side relationship, and further upon the animals opening the gate the operation is independent of the manual gate opening device.

A further object of this invention is to provide an animal feeder which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the animal feeder of this invention;

FIG. 2 is a fragmentary side elevational cross-sectional view of the rear or gate end of the feeder taken along line 2—2 in FIG. 1;

FIG. 3 is a view similar to FIG. 2 but showing the gate in its raised or opened position;

FIG. 4 is a fragmentary view generally similar to FIGS. 2 and 3 but showing the gate being raised by a control as is necessary in the release of the animals;

FIG. 5 is a cross-sectional view taken along line 5—5 in FIG. 2; and

FIG. 6 is a reduced in scale end elevation view of a series of animal feeders in side by side relationship and arranged to be operated in unison.

This invention is generally referred to in FIG. 1 by the reference numeral 10 and is shown to include an animal feeder or stall having elongated side sections 12 and 14 with a forward end section 16 which carries a feed trough 18 exposed only into the chamber 20 of the animal feeder.

At the rear end, an access opening to the chamber 20 is provided and includes a gate assembly 22.

The opening into the compartment 20 is defined by a pair of vertically spaced apart posts 24 and 26 interconnected at their lower ends by a support base portion 28 and at their upper ends by a rotatable shaft 30. A pair of U-shaped inwardly facing guide tracks 32 and 34 are provided on the inner edges of the vertical posts 24 and 26.

The gate assembly 22 includes an upper section 36 and a lower section 38 pivotally carried thereon. The upper section 36 has a pair of sleeves 40 and 42 through which the shaft 30 rotatably extends. A stop element 44 rigidly interconnects the sleeves 40 and 42 and is adapted to engage an upstanding post 46 rigidly extending from the shaft 30. It is been that upon a predetermined rotation of the shaft 30 the post 46 will engage the stop element 44 and thus pivot the upper or first gate section 36 upwardly. It is seen that an elongated rod 48 extends from the post 46 forwardly along the length of the feeder 10 to a control arm 50 pivotally connected to the feeder adjacent the forward end thereof.

The lower end of the upper gate section 36 includes a transversely extending member 52 having ends which extend outwardly into engagement with the exterior surface of the end posts 24 and 26 and thus prevent the upper gate section 36 from pivoting inwardly into the chamber 20.

The lower gate section has a pair of side members 54 and 56 pivotally mounted on the transversely extending member 52 of the upper gate section 36. A lower transversely extending portion 58 is provided on the gate section 38 and is provided with guide pins 60 and 62 movably positioned in the guide tracks 32 and 34.

In operation it is seen that animal 70 (FIG. 2) may place its nose under the cross-member 58 of the bottom gate section 38. As the animal pushes upwardly with its nose the gate sections 36 and 38 will move upwardly with the pivotal axis of the connection therebetween moving outwardly to the position shown in FIG. 3. At this time the animal 70 is midway through the opening into the compartment 20 and the gate is at its highest elevation. Upon the animal completely entering the compartment 20 the gate sections 36 and 38 will fall back to their closed position by forces of gravity. During this operation, the manual lifting control unit is not affected. It is seen however that when it is desired to release the animals the rotation of the shaft 30 by pulling the rod 48 connected to the post 46 in the direction shown by the arrow in FIG. 4 will cause the post 46 to engage the cross piece 44 on the upper gate section 36 and thus effect the opening of the gate 22. When the gate is to be closed, the hand lever 50 is moved back to its forward position of FIG. 1 and the gate will again fall to its closed position by the forces of gravity. It is seen that the outer ends of the transversely extending portion 52 by engaging the vertical posts 24 and 26 prevent the two gate sections 36 and 38 from forming an outer angle of less than 180 degrees. Accordingly, each time the gate is raised, it will always fold outwardly away from the interior or compartment 20 of the animal feeder 10.

Frequently it will be desirable to place a plurality of feeders 10A in side by side relationship with the gates 22A having a common rotatable shaft 30A such that operation of the control lever 50 on one of the feeders 10A will cause the opening of all of the gates 22A. It is therefore believed apparent that with the use of a series of five or ten stalls each gate may be opened by the animal individually and closed by gravity. After the animals have been feeding for the desired length time, they may all be released simultaneously by the use of the single lever.

Some changes may be made in the construction and arrangement of my animal feeder without departing from the real spirit and purpose of my invention, and it is my intention to cover by my claims, any modified forms of structure or use of mechanical equivalents which may be reasonably included within their scope.

I claim:
1. An animal feeder comprising,
   an enclosure structure,
   a feeding station at one end of said enclosure,
   a gate at the end of said enclosure structure opposite said feeding station,
   said gate including a pair of vertically arranged sections pivotally interconnected, one of said sections being pivoted to said structure adjacent the top thereof,
   an opening means connected to said gate for pivoting said one section upwardly and downwardly thereby raising and lowering said second section when moving said gate between open and closed positions,
   guide means on said structure for engaging the lower end of said second section to maintain said lower end in a single vertical plane as said gate is opened and closed,
   said guide means including a vertically disposed track and a finger on said second section movably disposed in said track whereby upwards pressure on the lower edge of said second sections will move said gate up to said open position,
   said opening means including an upstanding post operatively connected to the first section adjacent the upper end thereof, an elongated member extending forwardly along said enclosure structure,
   and a control means connected to said elongated member and positioned adjacent the forward end of said enclosure structure for reciprocating said elongated member to open and close said gate.
2. An animal feeder comprising,
   an enclosure structure,
   a feeding station at one end of said enclosure,
   a gate at the end of said enclosure structure opposite said feeding station,
   said gate including a pair of vertically arranged sections pivotally interconnected, one of said sections being pivoted to said structure adjacent the top thereof,
   an opening means connected to said gate for pivoting said one section upwardly and downwardly thereby raising and lowering said second section when moving said gate between open and closed positions,
   guide means on said structure for engaging the lower end of said second section to maintain said lower end in a single vertical plane as said gate is opened and closed,
   said guide means including a vertically disposed track and a finger on said second section movably disposed in said track whereby upwards pressure on the lower edge of said second sections will move said gate up to said open position, and
   stop means being provided adjacent the connection between said first and second sections for engagement with said enclosure structure to limit the inward movement of said first and second gate sections into said enclosure structure.
3. The structure of claim 1 wherein a shaft extends along the pivotal axis of said gate and said shaft is rotatably secured to said enclosure structure with said first gate section being rotatably secured to said shaft, said post being further defined as being secured to said shaft adjacent said first gate section, and stop means for said first gate section for engagement with said post for pivoting said first gate section upwardly upon a predetermined rotation of said shaft and said first gate section being free to rotate by gravity to its closed position upon a predetermined rotation of said shaft in the opposite direction.
4. The structure of claim 2 wherein said stop means and said guide means limits the pivotal movement between said first and second gate sections such that the outer angle between the planes of said first and second gate sections is at least 180 degrees.
5. The structure of claim 1 wherein a plurality of enclosure structure are positioned in side by side relationship, the axes of pivotal movement of said gates on said structures being in alignment, means interconnecting said gates for pivotal movement together between said open and closed positions.
6. The structure of claim 5 wherein a common shaft extends along the pivotal axes of each of said gates and said shaft is rotatably secured to said enclosure structure with said first gate sections of each gate being rotatably secured to said shaft, said post being further defined as being one of a series of posts secured to said shaft adjacent each of said first gate sections, and stop means for each of said first gate sections for engagement with the adjacent post for pivoting said first gate sections upwardly upon a predetermined rotation of said shaft and said first gate sections being free to rotate by gravity to their closed position upon a predetermined rotation of said shaft in the opposite direction.

References Cited

UNITED STATES PATENTS

| 661,987 | 11/1900 | Hinks | 119—27 |
| 809,923 | 1/1906 | Lewis | 119—27 |
| 2,601,845 | 7/1952 | Youngman | 119—27 |
| 3,101,776 | 8/1963 | Voris | 160—207 X |

FOREIGN PATENTS

| 875,897 | 8/1961 | Great Britain. |

HUGH R. CHAMBLEE, *Primary Examiner.*

U.S. Cl. X.R.

119—20